United States Patent [19]

Burgess et al.

[11] Patent Number: 4,809,199

[45] Date of Patent: Feb. 28, 1989

[54] KEYLESS ACCESS AND ENGINE CONTROL SYSTEM

[75] Inventors: James P. Burgess, Camarillo, Calif.; David J. Pearson, Roseville, Mich.

[73] Assignee: Electro-Mechanical Products, Rochester, Mich.

[21] Appl. No.: 897,512

[22] Filed: Aug. 18, 1986

[51] Int. Cl.[4] ........................ H04Q 9/00; G08B 19/00

[52] U.S. Cl. ...................................... 364/550; 340/64; 340/825.31; 361/171

[58] Field of Search ................... 364/550; 307/10 AT, 307/10 R, ; 340/63, 64, 825.31, 825.56, 576; 123/198 B, 19 D, 179 B; 180/287; 361/171, 172

[56] References Cited

U.S. PATENT DOCUMENTS

| | | | |
|---|---|---|---|
| 3,886,535 | 5/1975 | Cirincione | 340/527 X |
| 4,438,752 | 3/1984 | Cheung | 123/198 B |
| 4,463,340 | 7/1984 | Adkins et al. | 307/10 AT |
| 4,477,874 | 8/1984 | Ikuta et al. | 364/424 |
| 4,492,959 | 1/1985 | Mochida et al. | 340/825.56 |
| 4,532,507 | 7/1985 | Edson et al. | 340/825.31 |
| 4,677,284 | 6/1987 | Genest | 340/825.31 X |
| 4,688,036 | 8/1987 | Hivano et al. | 70/257 |

*Primary Examiner*—Parshotam S. Lall
*Assistant Examiner*—Ellis B. Ramirez
*Attorney, Agent, or Firm*—Krass & Young

[57] ABSTRACT

A keyless marine access and engine control system. The system is caused to change from a dormant state to an enabled state when a sequence of actuation signals entered through a keypad matches data representing either one of two access sequences stored in the system's memory. When the system is in its enabled state, the system responds only to signals representing a keypad actuation exceeding a first predetermined time interval. These signals are used to crank, choke, and stop a marine vehicle engine. The secondary access sequence can be changed by a person who knows either the primary access sequence or the secondary access sequence, while the primary access sequence can be changed only by a person having knowledge of the present primary access sequence. In order to reprogram either access sequence, a programming button must be actuated for a predetermined time interval exceeding the first time interval. The system can be used with either a single or dual engine installation.

10 Claims, 5 Drawing Sheets

KEYLESS ACCESS AND ENGINE CONTROL SYSTEM

FIELD OF THE INVENTION

This invention relates to apparatus for controlling access to, starting, choking, and stopping a vehicle engine. More particularly, this invention relates to an apparatus for accepting a predetermined access sequence of signals and, thereafter, generating start, choke, and stop engine signals only in response to signals whose duration exceeds a predetermined time interval.

BACKGROUND OF THE INVENTION

Apparatus for allowing access to the interior of an automobile and/or starting controls without using a conventional key have long been known. These keyless systems typically require the entry of a proper sequence of key depressions through an array of switches, after which access to the automotive interior or access to the engine starting controls is allowed. These systems obviate the need for an authorized user of the automobile to carry keys to gain access. Some such systems can also serve a theft-deterrent function by causing an alarm to be produced if sufficiently many incorrect entrance signals are attempted by an unauthorized person who wishes to gain access to the automobile and/or engine starting controls. Such a system is disclosed by Hinrichs in U.S. Pat. No. 3,691,396. Other systems serving similar functions are disclosed by Ellsberg in U.S. Pat. No. 4,233,642, by Betton in U.S. Pat. No. 4,533,016, and by Cook et al in U.S. Pat. No. 4,545,343.

In most automotive keyless entry systems, it is possible for the vehicle owner to change the access sequence. However, because these system's do not provide a feedback signal to the user to indicate whether each switch actuation has been recognized by the entry system, it is possible that the access sequence can be inadvertently changed to an undesired and unknown sequence. Under these circumstances, it can be necessary for the automobile owner to get assistance from its manufacturer or a dealer in order to regain access, at the cost of significant inconvenience to the owner.

While those systems that allow access to engine starter controls (for example, activating a normal key-operated ignition/starter switch) may work well in automotive applications, they are not appropriate for controlling access to the controls of vehicles subject to greater lurching motions than a typical automobile. Such vehicles include off-road vehicles, and, most especially, powerboats. The fact that such vehicles are subject to motions that may lead to inadvertent actuation of engine controls, such as ignition, starter, and choke controls, makes it desirable to provide these vehicles with apparatus that prevents such inadvertent actuation. Furthermore, keyless sytems can provide a level of convenience to operators of these vehicles who do not wish to carry keys or who are subject to irretrievably losing such keys, e.g., into a body of water.

It is further desirable to have a keyless access system that significantly reduces the chance that an access sequence will be inadvertently changed to an unknown sequence.

SUMMARY OF THE INVENTION

The present invention is an apparatus having a keyboard for entering access sequences and, thereafter, for producing engine control signals in response to keyboard-entered signals whose durations exceed predetermined time intervals. The apparatus is compatible with ancillary safety equipment such as marine gas sniffers and can have two distinct access sequences.

One access sequence can be used by authorized users to gain access to the engine starter controls, while the second, "guest," access sequence can be provided by an authorized user to persons needing temporary access to the controls. For security purposes the "guest" access sequence can be changed by an authorized user or a person with temporary access, while the primary access sequence can be changed only by an authorized user. Access sequences are changed after placing the apparatus in a reprogramming mode that can be entered only by actuating a predetermined switch for a relatively long predetermined time interval.

In general, the apparatus of the invention comprises an array of manually actuable electrical switches, a memory for storing data representing an access sequence, a clock, and a microprocessor connected to the array of switches, the memory, and the clock, the microprocessor being operable to compare the stored access sequence and a sequence of actuation signals to cause the apparatus to enter into an enabled state when the access sequence matches the sequence of actuation signals, and, after being enabled, to change to a dormant state or to generate crank, choke, and stop engine signals only in response to switch actuation signals that have time durations exceeding a first predetermined time interval.

In one embodiment, the apparatus can store a second access sequence which is changeable upon entry of a prescribed sequence of commands entered through the array of electrical switches. In a further embodiment, the apparatus can comprise an alarm circuit for producing an alarm signal when a predetermined number of switch actuations has been entered, no subsequence of the sequence of switch actuations corresponding to an access sequence. In a still further embodiment, the apparatus can comprise a gas sniffer for sending signals to the microprocessor when the explosive air/fuel mixture is present in an engine compartment. In yet another embodiment, the data representing the access sequence stored in the memory can be changed by actuating a predetermined key for a time interval exceeding the first predetermined time interval.

DETAILED DESCRIPTION OF AN EMBODIMENT OF THE INVENTION

While the present invention can be used in any of a variety of vehicles subject to lurching motion, such as lawn mowers and off-road vehicles, it will be described in the context of an engine-powered boat. Those skilled in the art to which this invention pertains will readily appreciate the wide variety of vehicles with which the present invention can be used.

Figure 1:
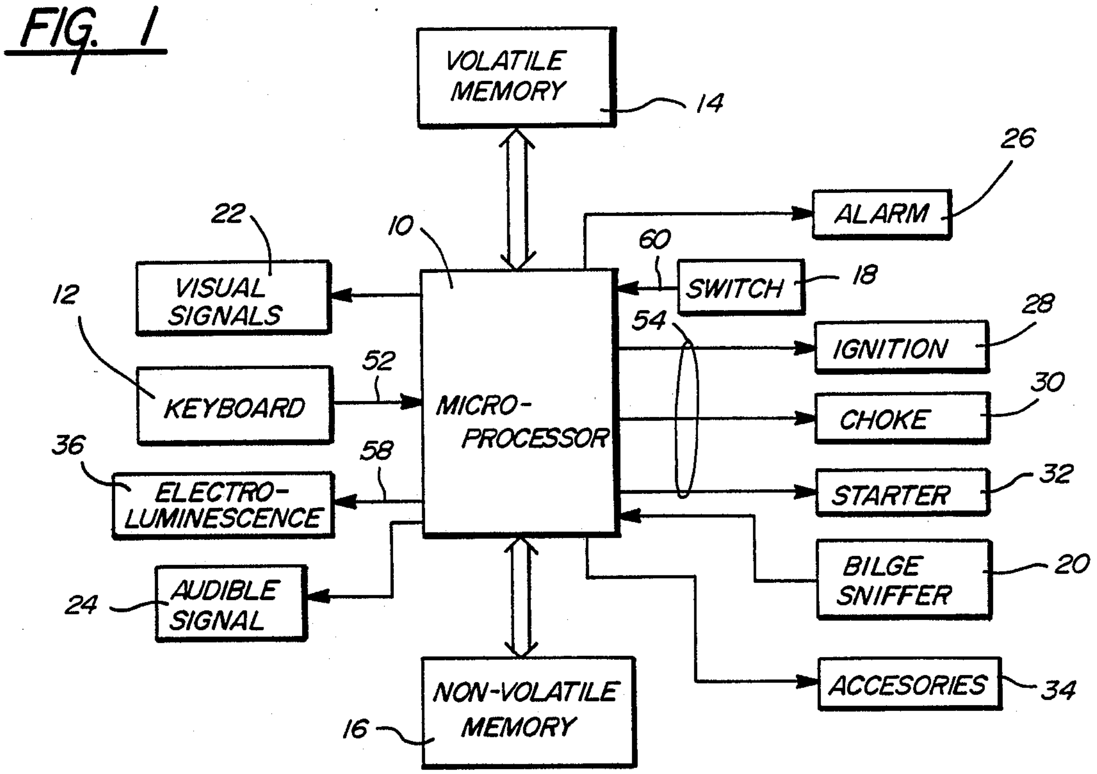
FIG. 1 is a block diagram of one embodiment of the present invention.

Referring now to FIG. 1 of the drawings, a block diagram of the apparatus of the present invention can be seen. Microprocessor 10 receives signal inputs from keyboard 12, volatile memory 14, non-volatile memory 16, and switch 18. In some marine applications, microprocessor 10 can further receive signals from one or more gas sniffers 20 located in the bilge. Microprocessor 10 generates signals that can be sent to visual signals 22, audible signal device 24, alarm 26, one or more engine ignition, choke, and starter, 28, 30, and 32, respectively, and other accessories 34. The control signals produced by microprocessor 10 are normally low-power signals used to control higher power devices, such as an engine starter, through a series of amplifiers and/or high current relays. In many applications, volatile memory 14 is not necessary.

The apparatus of the present invention has two states—a dormant state and an enabled state. In its dormant state, microprocessor 10 is operating in a very low-power mode prepared to receive a switch actuation signal from the switch array of keyboard 12. Upon receiving a signal indicating this first switch actuation, microprocessor 10 begins to operate according to a program that has been stored in its non-volatile memory 16. This program is responsive to switch actuations indicated by signals produced by keyboard 12. A symbol corresponding to each such switch actuation is entered sequentially in a register in microprocessor 10. Microprocessor 10 continually compares the sequence in the register with a primary access sequence contained in non-volatile memory 16 and, possibly, with a secondary access sequence stored in volatile memory 14. If the symbol sequence contained in the register is identical with either the access sequence stored in non-volatile memory 16 or the access sequence stored in volatile memory 14, the access and engine control system provisionally ready to enter its "enabled" state. Otherwise, the system cannot enter the "enabled" state, and will either reenter the dormant state or, possibly, produce an alarm signal.

After receiving a signal indicating a first switch actuation in keyboard 12, microprocessor 10 causes electrical power to be sent to electroluminescent device 36. Device 36 is located adjacent or immediately behind keyboard 12, causing keyboard 12 to light up. Microprocessor 10, after receiving its first signal indicating a switch actuation, is responsive to any switch actuation received within 5 seconds of the last actuation. (This time period can be varied to suit the needs of any particular application of this invention.) While it is unimportant to know the key pressed to produce the first switch actuation signal, the subsequent entry of an access sequence can make it desirable that the keyboard be lit in case of nighttime operation. Following the receipt of each signal representing a keyboard switch actuation, microprocessor 10 causes an audible signal to be produced by audible signal device 24, the audible signal serving as a feedback signal to the person operating keyboard 12, confirming that the signal was received by the microprocessor.

When the system is in its enabled state, it can produce engine control signals, including turning on and off an engine's ignition system, operating an engine's choke, and causing an engine's starter motor to engage and crank the engine. Because the lurching motion of many vehicles, for example, boats, could otherwise cause the inadvertent actuation of keyboard 12 when the system is in its enabled state, microprocessor 10 is programmed to require that each key be actuated for greater than a predetermined period of time (such as 300 milliseconds) before microprocessor 10 will respond thereto. This prevents the accidental cranking of already-running engine, an undesired turning-off of an engine, and an untimely cranking of an engine.

As will be explained further in the following, certain inboard engine marine vehicles are equipped with fuel fume detectors ("gas sniffers") to detect the presence of a potentially explosive air/fuel mixture in a compartment of the boat. Any spark produced under such circumstances, such as by the activation of an ignition system or an engine starter system, can produce a disastrous explosion. Therefore, in marine applications employing a gas sniffer, microprocessor 10 can be programmed to respond to signals produced by gas sniffer 20, before entering the enabled state, by (1) producing a suitable warning signal, (2) disabling any spark-producing operations such as turning on an engine's ignition or cranking the engine, or (3) turning on blowers to reduce the air/fuel mixture below potentially explosive limits. The system can also be used in an application having one or two outboard engines.

Figure 2:
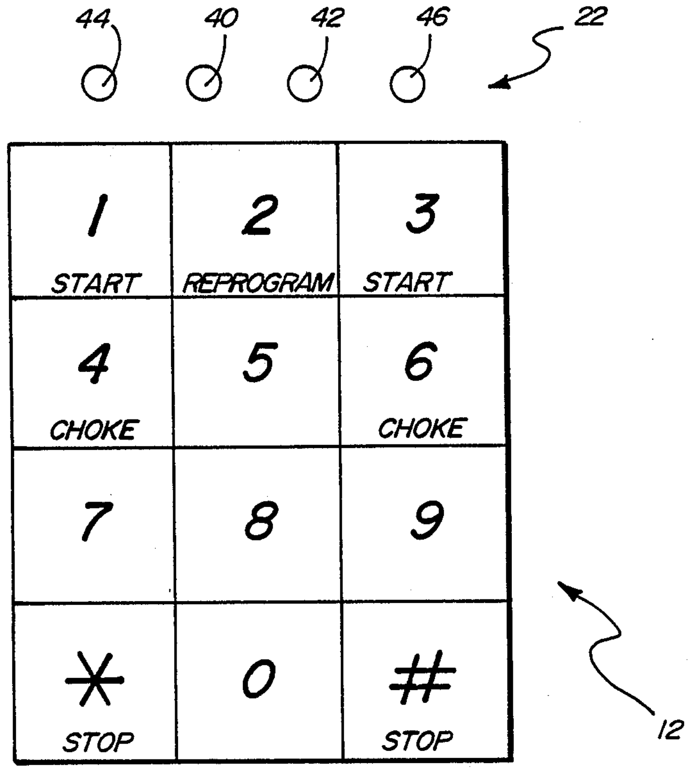
FIG. 2 is a close-up front view of the keypad and visual indicators used with one embodiment of the present invention.

FIG. 2 of the drawings is a close-up view of keyboard 12 and visual signals 22 shown in FIG. 1. Keyboard 12 can be a standard four-row three-column keypad such as found on a conventional pushbutton telephone. Visual signal 22 can, for example, take the form of four light-emitting diodes (LEDs) located immediately above keyboard 12. The visual signal is particularly useful when the present system is operated in an environment having high ambient noise levels. As shown in FIG. 2, the keypad is labelled with indicia to provide controls for a dual engine power boat. Buttons on the left side of keypad 12 are used to control the left engine, buttons on the right side of keypad 12 are used to control the right engine, and a button in the central column is used to reprogram the access sequences. In a vehicle having only one engine, the indicia on, for example, the right side of keypad 12 can be changed from the form shown in FIG. 2, so that it designates only numerals. Thus, in a single engine application, all engine controls will be provided by buttons on the left side of keypad 12. Keypad 12 can, of course, have other numbers of switches and other configurations, such as a linear array of five buttons.

As an alternative to using LEDs in visual signal 22, a display, such as a back-lit LCD display manufactured by Hitachi, can be used. When used, such a display can provide prompts to the user and display warnings, such as a "Turn On Blower" warning, when an engine is about to be started. An LCD display can be connected to provide a usual verification each time a key is depressed, showing the user the sequence of symbols entered at any point in time. An engine's status, i.e., running, ignition on, or ignition off, can also be presented on the LCD array, with the left hand portion dedicated to provide information about the left hand engine, while the right hand portion is for the right hand engine.

Each time a signal produced by actuation of a switch in keypad 12 is accepted by microprocessor 10 (see FIG. 1), the "entered" LED 40 is momentarily lit, providing a visual indication, in addition to the audible indication by audible signal device 24, that the switch actuation has been received by microprocessor 10. After the entry of a sequence of switch actuations that is identical to an access sequence stored in either memory 14 or memory 16 (see FIG. 1), when the apparatus has entered the "enabled" state, the ENABLE LED 42 is lit, signifying to the user that the apparatus is now prepared to receive engine control signals.

In the "enabled" state, following a momentary depression of the left-hand "Start" switch, also read as a "1", the ignition circuit of the left-hand engine is activated. This activation is signified by illumination of the left-hand LED 44 in visual signal array 22. If the "1" button is depressed for a longer period of time, say, a time exceeding 300 milliseconds, a signal is sent by microprocessor 10 to starter 32 (see FIG. 1), causing the left-hand engine to crank. The requirement that the "1" be depressed for more than a momentary period of time substantially reduces the likelihood that the left-hand engine will crank at an inopportune time. If the engine is one equipped with a non-automatic choke, depressing the "4" button will actuate the choke. The choke will remain closed as long as the "4" button is depressed. If the engine is equipped with an automatic choke, the "CHOKE" indicator under the "4" button can be eliminated.

To stop the left-hand engine, the left-hand engine's ignition system is turned off when the "*" button is depressed for at least a predetermined period of time, say, 300 milliseconds. After the "*" button has been released, the left-hand engine's ignition system remains off, but the starter system remains in the ENABLED state as signified by LED 42 being lit.

The operation of the right-hand engine is controlled in an analogous fashion, using the "3" button to control the ignition and the starter, the "6" button to control the choke, and the "#" button to stop the right-hand engine.

To cause the system to reenter its dormant state, the "*" and "#" buttons must be depressed simultaneously and held for a predetermined period of time, such as 300 milliseconds. When the ignition system for the right-hand engine is on, LED 46 is lit. When the microprocessor of the system reenters its dormant state, all of the indicators in visual indicator array 22 are turned off.

The access codes stored in non-volatile memory 16 and, possibly, in volatile memory 14 can be changed by entering the proper sequence of commands through keypad 12. One access sequence, called the primary access sequence, comprising, say, five keypad symbols, is intended to be memorized by all authorized operators and stored in non-volatile memory 16. The other access sequence, called the secondary access sequence, has the same length as the primary access sequence and may be entered and given by an authorized person to a temporarily authorized person such as a guest, a repairman, or a parking valet. The secondary access sequence can be stored in volatile memory 14 and redesignated, or "reprogrammed," by entering a proper sequence of symbols through keypad 12. The primary access sequence, on the other hand, can only be reprogrammed through keypad 12 after a switch located in a secure location on the boat has been activated for that purpose. Therefore, while the secondary access sequence can be reprogrammed by a person having knowledge of either the primary or secondary access sequences, the primary access sequence can only be changed by a person knowing the present primary access sequence and having knowledge of the location of the reprogramming switch. Placing the primary access sequence in the non-volatile memory 16 insures that the boat owner will be able to access the engine controls of his boat as long as he has it memorized.

To reprogram the secondary access sequence, the "2" ("Reprogram") button of keypad 12 must be depressed for at least three seconds. This requirement that the "2" button be depressed for a relatively long time interval assures that the reprogram mode is very unlikely to be enetered inadvertently. This protects the stored access sequences from being overwritten by a subsequent sequence of switch actuations, regardless of whether the vehicle is subject to lurching motion. After microprocessor 10 has detected that the "2" button has been depressed for at least three seconds, it causes LED 40 and audible signal device 24 to be briefly activated. Following this, a new secondary access sequence is entered by depressing the appropriate sequence of keys (including the "*" and "#" keys). This newly-designated sequence will then serve as the secondary access sequence until it is changed again. The primary access sequence can be changed similarly, except that a switch hidden in the housing containing the circuitry of the present invention must first be activated.

Figure 3:
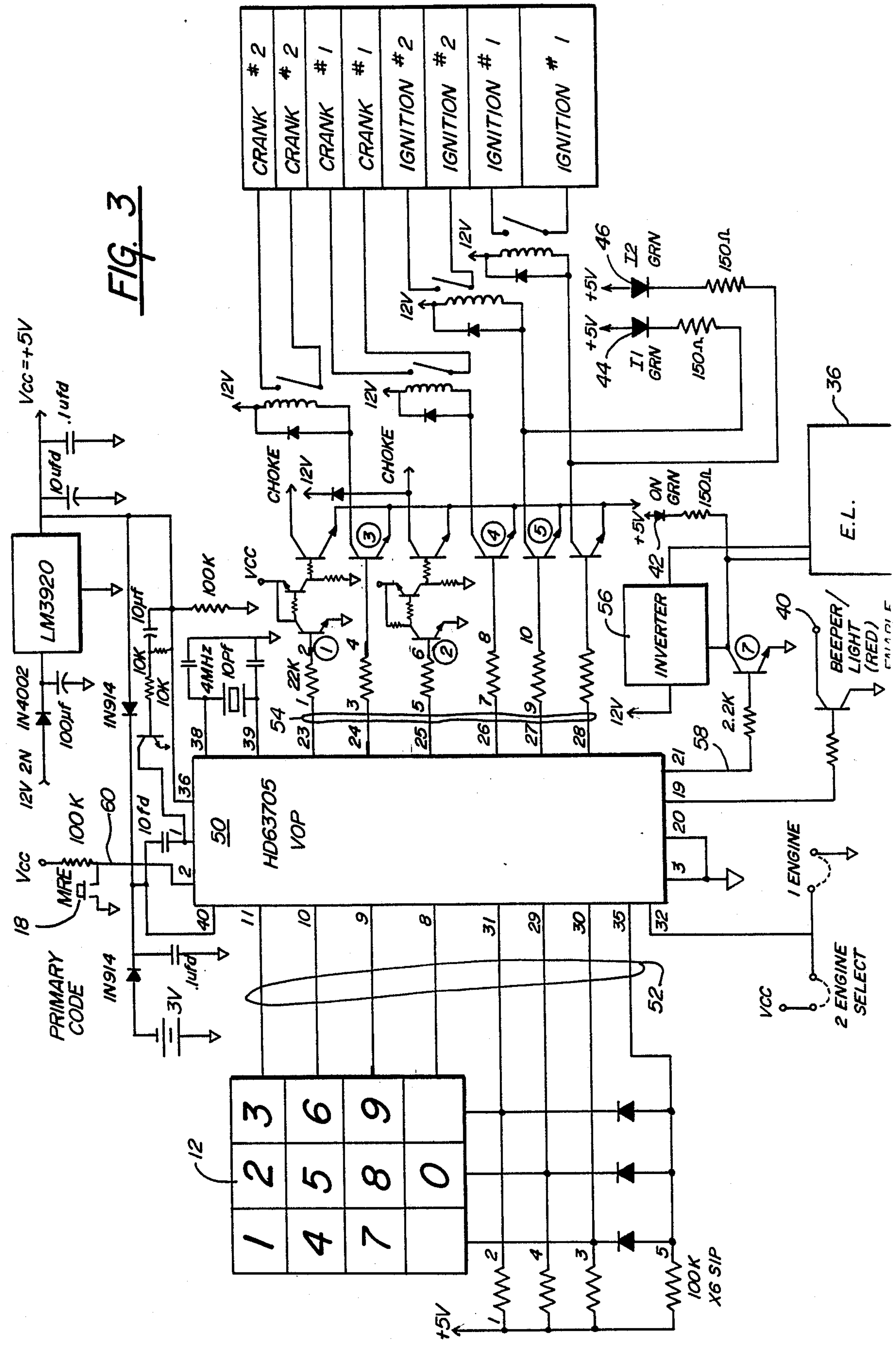
FIG. 3 is a schematic diagram of the circuitry of one embodiment of the present invention.

FIG. 3 of the drawings shows a schematic diagram of one embodiment of the present invention. Microprocessor 10, volatile memory 14, and non-volatile memory 16 are all contained in microcomputer chip 50. A suitable microcomputer chip is a Hitachi HD63705. This microcomputer contains an eight-bit microprocessor, a clock, four kilobytes of PROM, 192 bytes of RAM, and various input/output and communication interfaces. Keypad 12 can be connected to input lines 52, while outputs, such as the crank and ignition outputs, are controlled on output lines 54. Output lines 54 lead to amplifier and relay circuits to control the high-powered cranking and ignition circuits. The high voltage required by electroluminescence apparatus 36 is produced by inverter 56 which, in turn, is controlled by control signal 58. Switch 18, useful in reprogramming the primary access sequence, is connected to the microprocessor over line 60. LEDs 40–46, belonging to visual signal array 22, are connected to microcomputer 50, and various other circuits (such as alarm 26, gas sniffer 20, and accessories 34) are connected to microcomputer 50 through other available input/output lines.

Figure 4:
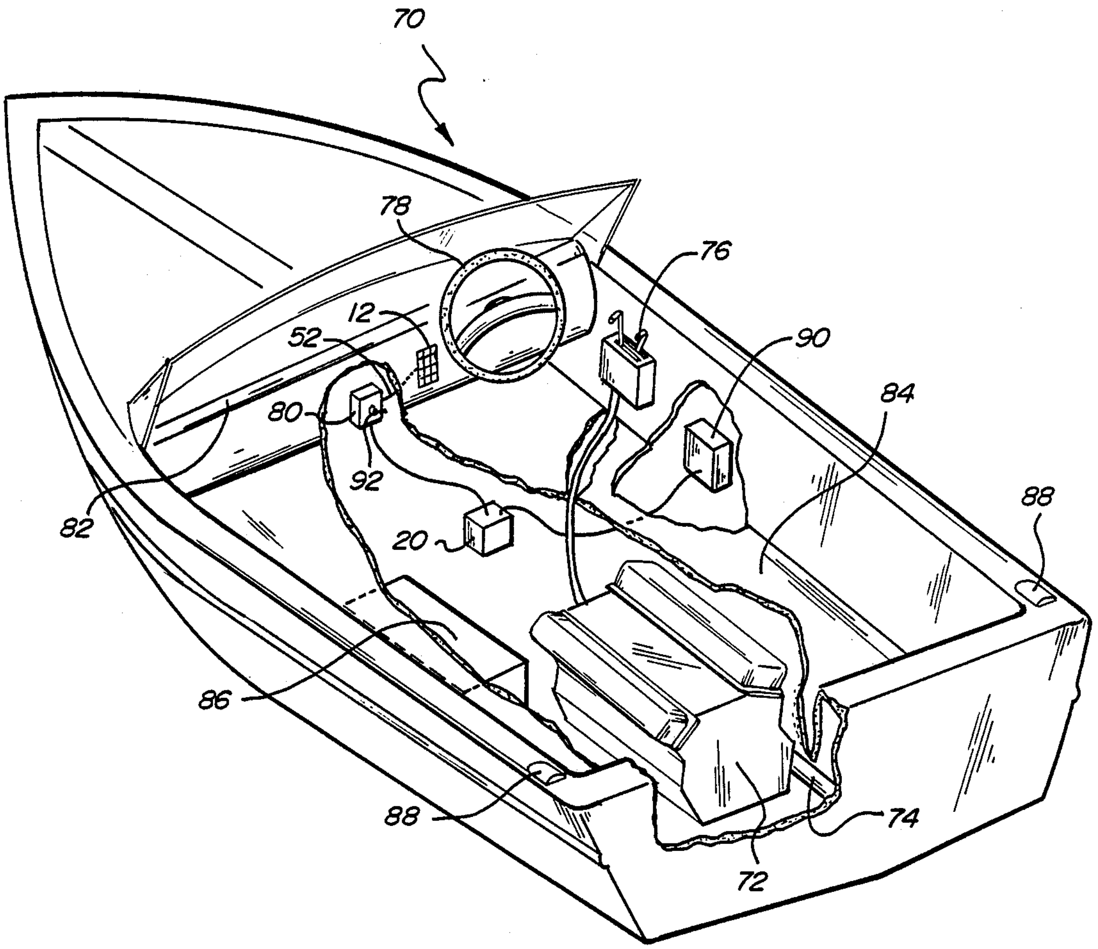
FIG. 4 is a cut-away view of one embodiment of the present invention as may be used in a marine application.

FIG. 4 shows the apparatus of the present invention in a single-engine boat. The boat 70 has an engine 72 connected to a driveshaft 74 which, in turn, leads to a propeller or other means for providing motive power. The engine, and any transmission, is controlled by means of handles 76, one handle controlling throttle position, while the other handle controls transmission gear (i.e., forward, neutral, or reverse). Adjacent steering wheel 78 and on the opposite from controls 76 is keypad 12, as shown in FIG. 2. Keypad 12 is connected through a cable 52 to a housing 80 located in a out-of-the-way place, such as under dashboard 82 or under decks 84. Housing 80 carries an electrical switch 92 located on or within for use when reprogramming the primary access sequence. Preferably, housing 80 is placed in a location that is secured within the hull of the boat.

Engine 72 is provided fuel supplied from fuel tank 86. Both engine 72 and fuel tank 86 are located in the bilge, below deck 84. Accordingly, it is possible that fuel fumes can accumulate under deck 84, presenting an explosion hazard. Vents 88 connecting the under-deck space containing engine 72 and fuel tank 86 with the atmosphere are intended to vent some of these fumes. To assist this venting operation, a blower 90 is located below deck 84 to supply fresh air to the under-deck space and force the fuel mixture out through vents 88. To detect a potentially hazardous fuel fume concentration, gas sniffer 20 is located below deck 84, preferably in a place close to engine 72. Sniffer 20 is connected both to blower 90 and to housing 80, providing a blower control signal to blower 90 and an output signal to the circuitry contained within housing 80. In particular, gas sniffer 20 produces a signal which is sent microprocessor 10 (see FIG. 1). This signal can result in the display of a "Turn On Blower" warning, if the system is equipped with the LCD display described earlier.

In this embodiment, after the keyless ignition system has been enabled, a signal from gas sniffer 20 indicating a potentially hazardous fuel vapor mixture below deck 84 will produce a signal which the circuitry of the keyless ignition system detects and interprets to prevent the engine ignition system or cranking system to be activated. In other embodiments, a signal from gas sniffer 20 at this point can cause a warning alarm condition to be signalled by audible signal device 24. Various other accessories located in the boat, such as radios, tape players, and navigational instruments can also be provided electrical power as accessories to the present keyless access and engine control system.

Figure 5A:
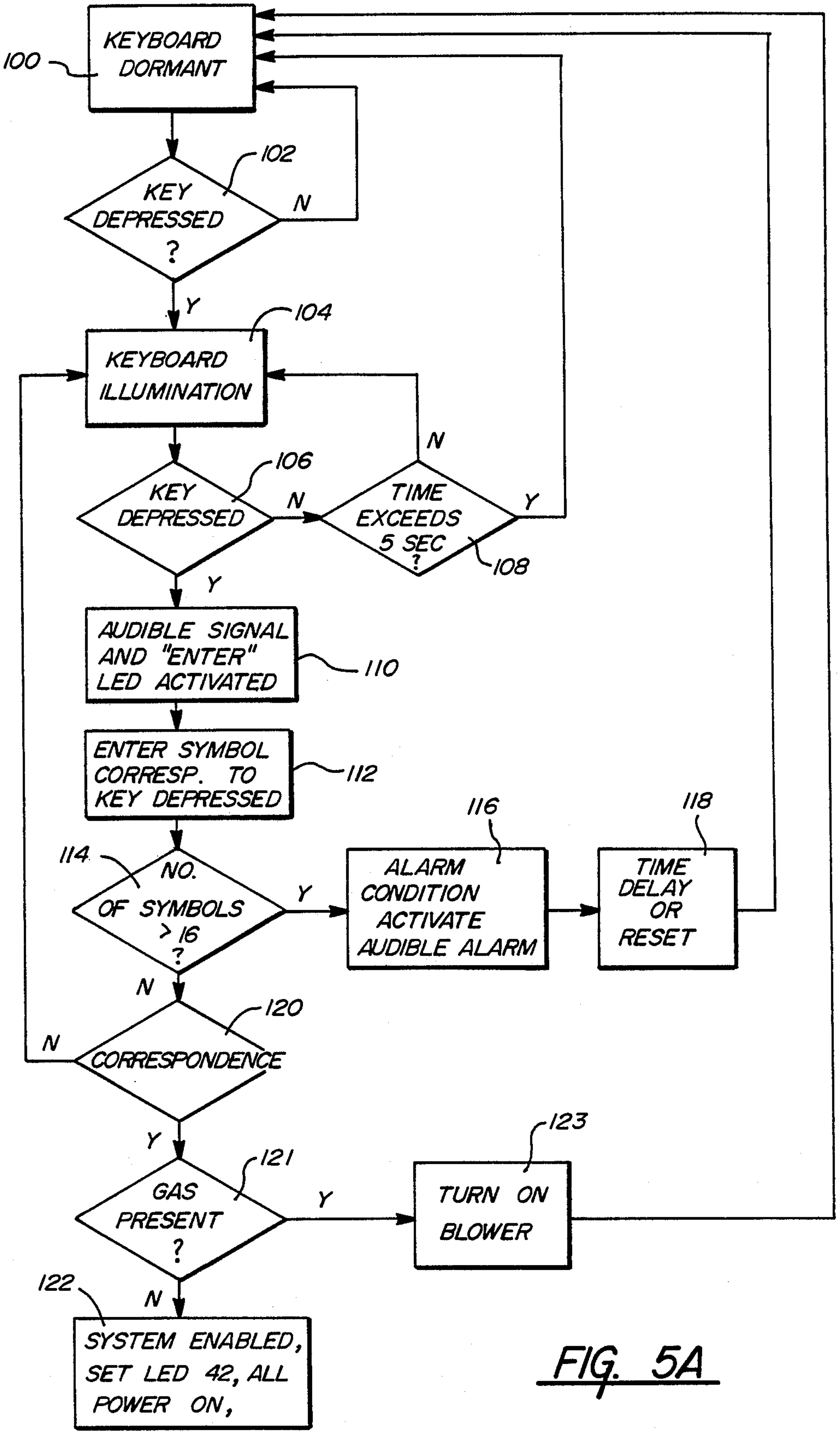
FIGS. 5A and 5A are flow charts of the sequence of operations followed by the apparatus of the present invention.
Figure 5B:
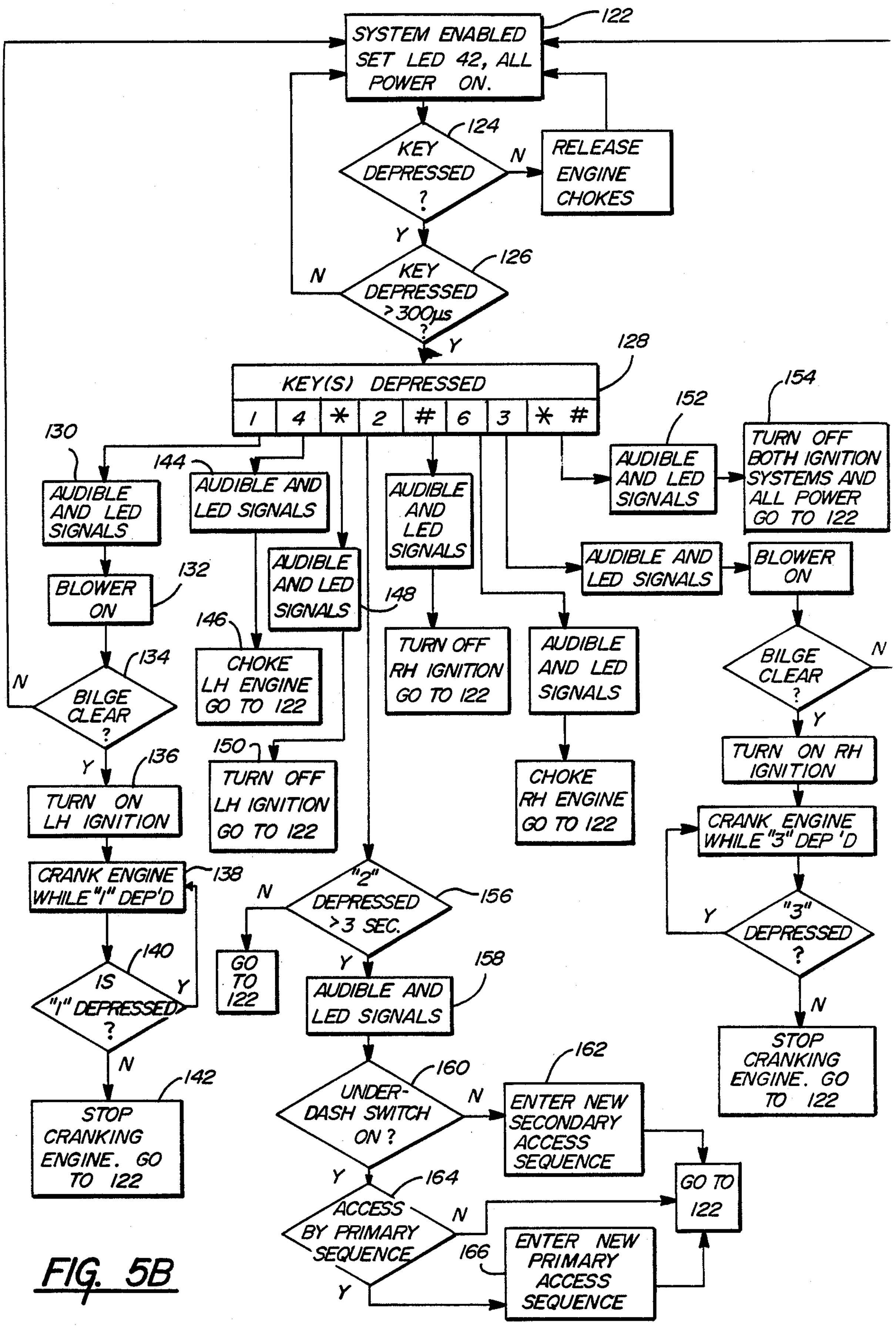

The logic of the computer program being implemented by microprocessor 10 is presented in FIGS. 5A and 5B. Initially, the system, including keypad 12, is in its dormant state, signified by block 100. This state is implemented in the Hitachi HD63705 microcomputer chip, shown as microcomputer 50 in FIG. 3, as a STOP state. The receipt of any signal from keypad 12 generates an interrupt signal within microcomputer 50, causing microcomputer 50 to enter its WAIT mode, wherein microcomputer 50 begins to operate according to its program. The first program step, after microcomputer 50 has detected that a key has been depressed, is to illuminate keypad 12 (block 104). Microcomputer 50 then is responsive to further depressions of keys on keypad 12. It enters a tight loop comprising blocks 104, 106, and 108, detecting whether a key has been depressed or more than five seconds have elapsed since the last key was depressed. If more than five seconds have elapsed since the last depression of a key (block 108), the keyless access and engine control system, including keypad 12, becomes dormant, returning to block 100. If, on the other hand, a key has been depressed within five seconds of the last key depression (block 106), audible signal device 24 (see FIG. 1) and ENABLED LED 42 (see FIG. 2) are momentarily activated (see block 110). The symbol corresponding to the depressed key is then entered in a register within microcomputer 50 (block 112).

The number of symbols entered in the register in block 112 is continually monitored by microcomputer 50. If this number exceeds 16, it is assumed that an unauthorized person is attempting to access the ignition system and, accordingly, an alarm condition exists. Therefore, if the number of symbols entered in the register of microcomputer 50 exceeds 16 in block 114, alarm 26 (see FIG. 1) will be turned on for a predetermined period of time, say, 30 seconds (block 118). Simultaneously, keypad 12 will be "locked out" by microcomputer 50 by ignoring any key depressions for a predetermined period of time, say, 30 seconds (although it can be different from the period of time for which alarm 26 is activated). Locking out keypad 12 will complicate the attempts of a person trying to enable the system by significantly slowing down the rate at which he can try access sequence combinations.

If, on the other hand, fewer than 16 symbols have been entered into the register of microcomputer 50, this sequence of symbols is compared to the primary and secondary access sequences, stored in memories 16 and 14, respectively (block 120). If no correspondence is found, control is sent back to block 104, where keypad illumination is maintained and the system awaits the entry of a further symbol. On the other hand, if a correspondence is found, the system checks to see whether the gas sniffer 20 detects fuel fumes (block 121). If no fumes are detected, the program progresses to block 122, the system ENABLED state. Enable LED 42 is turned on at this time, and power is also supplied to above-deck accessory devices through the system's ACC terminals (not shown).

If, on the other hand, fuel fumes are detected, the program proceeds to turn on the blower (block 123) for a predetermined period of time, say, two minutes, and returns the system to its dormant state (block 100). Obviously, if the boat has no gas sniffer, it is not possible for the program to go to block 123.

When in the ENABLED state, the system awaits the entry of further commands entered through keypad 12. Block 124 signifies that microcomputer 50 is awaiting the depression of a key. If none is detected, the microcomputer releases both engine chokes and continues to check for a key depression. If a key is depressed, control is sent to block 126, where the time of duration of the key depression is determined. If the time of duration does not exceed 300 milliseconds, then that key depression is ignored by microcomputer 50, the program returns to block 122, and the microcomputer awaits a subsequent key depression. If the key was depressed for more than 300 milliseconds, that key depression is accepted and further action is taken, depending upon the key that was depressed.

As shown in block 128, only eight different key depressions are recognized by microcomputer 50. They are "1", "4", "*", "2", "3", "6", "#", and the simultaneous depression of the "*" and "#" buttons. As explained above, depressing the "1" button causes audible signal device 24 to be turned on momentarily and LED 44 to be lit (block 130). Next, as shown in block 132, blower 90 (in FIG. 4) is turned on for a prescribed period of time. Microcomputer 50 next determines whether the bilge of the boat contains a safe level of fuel fumes (block 134). If not, the program returns to the ENABLED state (block 122). If the bilge is clear of fuel fumes, the left-hand engine ignition systems is turned on (block 136). The double level of safety represented by two quick checks of the gas sniffer when first starting an engine reflects a concern for safety and recognizes that the system can be maintained in the ENABLED state (block 122) after an engine (or the engines) has been operating, but then turned off. Under these circumstances, below-deck fuel fume accumulations are possible.

Assuming that the left-hand engine's ignition system is on, continuing to hold the "1" key down (blocks 138 and 140) causes th left-hand engine to crank. The cranking operation continues as long as the "1" key is depressed (block 140). When the "1" key is released, as shown in block 142, the program returns to block 122.

To interpret whether the "4" switch has been actuated to choke the left-hand engine, a sound signal is produced by audible signal device 24 and the "entered" LED illuminates briefly (block 144). Subsequently, a signal is sent to choke 30L (i.e., the choke on the left hand engine). In one embodiment, the choke can be held closed as long as the "4" button is depressed. In another embodiment, depressing the "4" button causes the choke to be closed for a predetermined period of time. From block 146, the program returns to block 122 to interpret the depression of further keys.

If the "*" button is depressed in block 128, an audible signal is produced by device 24 and LED 40 illuminates briefly (block 148). As shown in block 150, subsequently the left-hand engine ignition system is turned off, as is LED 44. Control then returns to block 122.

The "3", "6", and "#" buttons control the right hand engine (in a dual engine installation) analogously to buttons "1", "4", and "*", respectively.

If, in block 128, the "*" and "#" buttons are depressed together, audible sound device is briefly activated and LED 40 is momentarily lit (block 152). At this point, the ignition systems for both the left-hand and right-hand engines are turned off, as shown in block 154. Control of the program is then returned to the "keyboard dormant" block, block 100.

Finally, if, in block 128, the "2" button is depressed, microcomputer 50 detects that an attempt is being made to reprogram one of the two access sequences. As shown in block 156, the program first checks to determine whether the "2" switch was actuated for more than three seconds, in order to prevent the accidental reprogramming of an access sequence. If the three second period has been exceeded, audible signal device 24 emits a brief sound and LED 40 is momentarily lit (block 158). Otherwise, the program returns to block 122 for interpretation of further key depressions.

Following block 158, block 160 signifies the decision of whether the underdash switch 92 (see FIG. 5) is "on". If the switch is not on, microcomputer 50 receives the next five key depressions as a new second access sequence and stores the access sequence in computer memory (block 162). If switch 92 is on, decision block 164 signifies that the program next determines whether the system was enabled by gaining access through means of a primary access sequence. If it was not, control of the program returns to block 122; if it was, as shown in block 166, the next sequence of key depressions signifies the new primary access sequence, which is received and .stored in computer memory. Thereafter, control is returned to block 122 in order to receive other key depressions.

While modifications of the present invention will be apparent to one skilled in the art, such modifications fall within the spirit and scope of the present invention, which is set forth in the following claims.

We claim:

1. A keyless access system for producing signals to permit access to a vehicle, comprising:

an array of manually actuable electrical switches for entering a sequence of switch actuations and producing corresponding actuation signals in response thereto, each said actuation signal having a time duration equal to the duration of the corresponding switch actuation;

a memory for storing data representing at least one access sequence;

a clock; and a microprocessor connected to said array of electrical switches, said memory, and said clock, and programmed to receive a sequence of actuation signals from said array of switches, to compare said sequence of actuation signals to the data representing said at least one access sequence stored in said memory, and to produce said access signals when said sequence of actuation signals compares properly with the data representing said at least one access sequence stored in said memory, said microprocessor further being programmed to respond to the actuation of a predetermined one of said switches for at least a predetermined time interval by storing new data in said memory, said new data being entered through the array of switches and representing a new access sequence.

2. Apparatus, having a dormant state and an enabled state, for producing signals to crank, choke, start, and stop a vehicle engine, said apparatus comprising:

an array of manually actuable electrical switches for entering a sequence of switch actuations and producing corresponding actuation signals in response thereto, each said actuation signal having a time duration equal to the duration of the corresponding switch actuation;

a memory for storing data representing an access sequence;

a clock; and a microprocessor connected to said array of electrical switches, said memory, and said clock, said microprocessor being operable, when the apparatus is in the dormant state, to compare said access sequence and a sequence of actuation signals and to cause the apparatus to change from the dormant state to the enabled state when the access sequence matches a sequence of actuation signals, said microprocessor further, when the apparatus is in the enabled state, changing to the dormant state or generating crank, choke, and stop signals only in response to actuation signals that have time durations exceeding a first predetermined time interval.

3. The apparatus of claim 2, wherein said sequence of actuation signals comprises a predetermined number of actuation signals.

4. The apparatus of claim 2, wherein said microprocessor is operable to change the data representing an access sequence, according to a sequence of actuation signals produced by the array of electrical switches.

5. The apparatus of claim 2, wherein said memory stores data representing a secondary access sequence and said microprocessor is operable, when in the dormant state, to compare both said access sequence and said secondary access sequence with a sequence of actuation signals.

6. The apparatus of claim 2, said microprocessor, when the apparatus is in the enabled state, further responding to the actuation of a predetermined one of said electrical switches for at least a second predetermined time interval exceeding said first predetermined time interval, by receiving a subsequent predetermined number of electrical switch actuations as a new access sequence, said microprocessor replacing the data representing the access sequence in the memory by data representing the new access sequence.

7. The apparatus of claim 2, further comprising an audible signal device for producing an audible alarm signal when a sequence of actuation signals exceeds the predetermined number of actuation signals.

8. Apparatus for use in an engine-powered marine vehicle, said marine vehicle comprising a hull having an engine compartment, said apparatus having a dormant state and an enabled state and being capable of producing signals to crank, choke, start, and stop said engine, said apparatus comprising:

an array of manually actuable electrical switches for entering a sequence of switch actuations and producing corresponding actuation signals in response thereto, each said actuation signal having a time duration equal to the duration of the corresponding switch actuation;

a memory for storing data representing a primary access sequence and a secondary sequence;

a clock;

a fuel vapor sniffer located in said engine compartment for producing a signal indicating that the fuel vapor mixture in the engine compartment exceeds a predetermined explosive ratio; and a microprocessor connected to said array of electrical switches, said memory, said clock, and said vapor sniffer, said microprocessor being operable, when in the dormant state, to compare said primary access sequence and said secondary access sequence with a sequence of actuation signals and to cause the apparatus to change from the dormant state to the enabled state when either access sequence matches a sequence of actuation signals, said microprocessor further, when in the enabled state, changing to the dormant state or generating crank, choke, and stop signals only when said gas sniffer signal represents a safe fuel/air mixture ratio and, in response to actuation signals that have time durations exceeding a predetermined time interval.

9. The apparatus of claim 8, further comprising an audible signal device connected to said microprocessor for producing an audible alarm signal when the length of said sequence of actuation signals exceeds a predetermined length.

10. The apparatus of claim 8, further comprising a security switch having two positions, said security switch being connected to said microprocessor, said microprocessor, when the apparatus is in the enabled state, further responding to the actuation of a predetermined one of said electrical switches for at least a second predetermined time interval exceeding said first predetermined time interval, by receiving a subsequent predetermined number of electrical switch actuations as a new primary or secondary access sequence, depending upon the position of said security switch, said microprocessor replacing the data representing the primary or secondary access sequence in the memory by data representing the new primary or secondary access sequence, respectively.

* * * * *